(12) United States Patent
Cho et al.

(10) Patent No.: US 12,541,278 B2
(45) Date of Patent: Feb. 3, 2026

(54) ELECTRONIC DEVICE, AND OPERATION METHOD OF ELECTRONIC DEVICE

(71) Applicant: Samsung Electronics Co., Ltd., Suwon-si (KR)

(72) Inventors: Chungki Cho, Suwon-si (KR); Wonik Do, Suwon-si (KR); Seungnyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 18/455,261

(22) Filed: Aug. 24, 2023

(65) Prior Publication Data

US 2023/0409162 A1    Dec. 21, 2023

Related U.S. Application Data

(63) Continuation of application No. PCT/KR2022/003036, filed on Mar. 3, 2022.

(30) Foreign Application Priority Data

Apr. 7, 2021    (KR) .......................... 10-2021-0045210

(51) Int. Cl.
    *G06F 3/0482*    (2013.01)
    *G06F 3/0481*    (2022.01)
    *G06F 3/04847*   (2022.01)

(52) U.S. Cl.
    CPC ........ *G06F 3/0481* (2013.01); *G06F 3/04847* (2013.01)

(58) Field of Classification Search
    CPC ................................................ G06F 3/048–05
    See application file for complete search history.

(56) References Cited

U.S. PATENT DOCUMENTS

| 7,382,691 | B2 * | 6/2008 | Capozzi | ............... | G04G 9/0064 |
| | | | | | 368/69 |
| 10,761,702 | B2 * | 9/2020 | Block | ................... | G09G 5/005 |
| 2005/0278757 | A1 * | 12/2005 | Grossman | ............ | G04G 9/0064 |
| | | | | | 725/62 |

(Continued)

FOREIGN PATENT DOCUMENTS

| AU | 2017 277 851 A1 | 12/2018 |
| JP | 2001189968 A | 7/2001 |

(Continued)

OTHER PUBLICATIONS

Extended European Search Report dated Jun. 5, 2024 for EP Application No. 22784779.5.

(Continued)

*Primary Examiner* — Daniel Rodriguez
(74) *Attorney, Agent, or Firm* — Nixon & Vanderhye P.C.

(57) ABSTRACT

In an electronic device and/or an operation method of the electronic device, a configuration of the electronic device may be changed using at least first configuration information relating to an electronic device function mapped to a first screen when the first screen is displayed as a screen while the electronic device is in a standby state, and the configuration of the electronic device may be changed using at least second configuration information relating to an electronic device function mapped when a second screen is displayed.

11 Claims, 14 Drawing Sheets

(56) References Cited

U.S. PATENT DOCUMENTS

| | | |
|---|---|---|
| 2009/0186604 A1 | 7/2009 | Ruy et al. |
| 2016/0034167 A1* | 2/2016 | Wilson .................... G06F 3/016 |
| | | 715/771 |
| 2016/0327911 A1 | 11/2016 | Eim et al. |
| 2016/0357386 A1 | 12/2016 | Choi |
| 2017/0053542 A1* | 2/2017 | Wilson .................... G06F 3/011 |
| 2017/0075305 A1* | 3/2017 | Ryu ...................... G04G 9/0064 |
| 2017/0160898 A1* | 6/2017 | Lee ...................... G06F 3/0488 |
| 2017/0228121 A1 | 8/2017 | Wosk et al. |
| 2017/0269790 A1* | 9/2017 | Grandi .................... G06F 3/014 |
| 2017/0357426 A1* | 12/2017 | Wilson ................ G06F 3/04886 |
| 2018/0299836 A1 | 10/2018 | Qian et al. |
| 2019/0121300 A1* | 4/2019 | Peterson ............. G04G 99/006 |
| 2020/0218204 A1 | 7/2020 | Koh et al. |
| 2020/0264567 A1 | 8/2020 | Ok et al. |
| 2020/0310609 A1* | 10/2020 | Ham ...................... G06F 3/0484 |
| 2020/0344517 A1 | 10/2020 | Park et al. |
| 2020/0356242 A1 | 11/2020 | Wilson et al. |
| 2020/0356252 A1* | 11/2020 | Ko ......................... G04G 21/08 |
| 2020/0356687 A1* | 11/2020 | Salzman ................ H04L 63/108 |
| 2022/0013053 A1 | 1/2022 | Kim et al. |
| 2022/0083183 A1* | 3/2022 | Patton ................ G06F 9/44505 |

FOREIGN PATENT DOCUMENTS

| | | |
|---|---|---|
| JP | 2020109401 A | 7/2020 |
| KR | 20070045645 A | 5/2007 |
| KR | 101482103 B1 | 1/2015 |
| KR | 20160004770 A | 1/2016 |
| KR | 20160131275 A | 11/2016 |
| KR | 101686451 B1 | 12/2016 |
| KR | 20160142527 A | 12/2016 |
| KR | 20180095008 A | 8/2018 |
| KR | 20190089637 A | 7/2019 |
| KR | 102076727 B1 | 2/2020 |
| KR | 20200050696 A | 5/2020 |
| KR | 20200101209 A | 8/2020 |
| KR | 20200108116 A | 9/2020 |
| WO | 2020227330 A1 | 11/2020 |

OTHER PUBLICATIONS

International Search Report for PCT/KR2022/003036 mailed Jun. 17, 2022, 4 pages.
Written Opinion of the ISA for PCT/KR2022/003036 mailed Jun. 17, 2022, 3 pages.
Korean Office Action dated Nov. 12, 2025 for KR Application No. 10-2021-0045210.

* cited by examiner

ELECTRONIC DEVICE, AND OPERATION METHOD OF ELECTRONIC DEVICE

CROSS-REFERENCE TO RELATED APPLICATIONS

This application is a continuation of International Application No. PCT/KR2022/003036 filed on Mar. 3, 2022, designating the United States, in the Korean Intellectual Property Receiving Office, and claiming priority to KR Patent Application No. 10-2021-0045210 filed on Apr. 7, 2021, in the Korean Intellectual Property Office, the disclosures of all of which are hereby incorporated by reference herein in their entireties.

BACKGROUND

Field

Various example embodiments relate to an electronic device and/or an operation method of an electronic device and, for example, to an electronic device and/or an operation method of an electronic device for configuring the electronic device to a configuration value substantially matching a standby screen in response to a change of a standby screen of the electronic device.

Description of Related Art

Electronic devices capable of performing various functions and wearable on a user's body part are being developed. These electronic devices are generally referred to as wearable devices, among which an electronic device that has a shape similar to a watch and is capable of being worn on a user's wrist is referred to as a smartwatch.

In a smartwatch, a user may configure a standby screen, called a watch face, according to preference. A watch face exists in various forms, such as themes including analog, digital, and exercise modes, wallpapers of various images, active icons, and widget configurations. The user may download a watch face from an app store, or may share a watch face with other users. Further, the user may generate a watch face by using an application.

Various watch faces are being used, and a user may easily change a watch face according to a context based on a user environment or according to a simple swipe motion.

Apart from an operation of changing a watch face, configuration of an option of a smartwatch, such as the screen brightness of an electronic device and whether to activate an always-on display (AOD) mode, requires a separate operation, causing inconvenience to a user.

SUMMARY

As various types of wearable devices are released, a user may configure a watch face according to personality and a context by easily changing a favorite watch face.

Various example embodiments may provide an electronic device capable of storing a favorite configuration option of the electronic device according to a watch face and changing a configuration of the electronic device according to the stored configuration option when a watch face is changed.

The electronic device according to various example embodiments may map a favorite option configuration thereof to be changed according to a watch face, and may change an option in conjunction with a change of a watch face according to a context.

For example, when a user changes a watch face according to a context or when a watch face is automatically changed according to a context, the electronic device disclosed herein may change the configuration of the electronic device according to a favorite option of the user corresponding to the changed watch face. Further, when a watch face is changed after the configuration of the electronic device is changed, the electronic device may import a changed configuration option when reloading a previous watch face by storing a configuration option of the electronic device before the watch face is changed.

Technical aspects to be achieved in the disclosure are not limited to the technical aspects mentioned above, and other technical aspects not mentioned will be clearly understood by those skilled in the art from the following description.

An electronic device according to various example embodiments may include a display, a memory configured to store a plurality of screens including a first screen and a second screen displayed on the display when the electronic device is in a standby state, configuration information about the electronic device including first configuration information related to a function of the electronic device when the first screen is displayed and second configuration information related to a function of the electronic device when the second screen is displayed, and first mapping data in which the plurality of screens is mapped to the configuration information, and a processor, wherein the processor may be configured to receive an input to change the first screen to the second screen, switch a state of displaying the first screen to a state of displaying the second screen in response to the input, identify the second configuration information corresponding to the second screen, based on the first mapping data, and change a configuration of the electronic device, based on the second configuration information.

An operation method of an electronic device according to various example embodiments may include storing, in a memory, a plurality of screens including a first screen and a second screen displayed on a display when the electronic device is in a standby state, storing, in the memory, configuration information about the electronic device including first configuration information related to a function of the electronic device when the first screen is displayed and second configuration information related to a function of the electronic device when the second screen is displayed, storing, in the memory, first mapping data in which the plurality of screens is mapped to the configuration information, receiving an input to change the first screen to the second screen, switching a state of displaying the first screen to a state of displaying the second screen in response to the input, identifying the second configuration information corresponding to the second screen, based on the first mapping data, and changing a configuration of the electronic device, based on the second configuration information.

When a user changes a standby screen, a configuration of an electronic device may be automatically changed according to a favorite configuration.

When a new idle screen is obtained, a configuration corresponding to the new idle screen may be newly configured and stored.

When a new standby screen is obtained but a corresponding configuration is not newly configured, a current configuration of an electronic device may be stored as it is to provide user convenience.

When a configuration of an electronic device is changed, configuration information corresponding to a previous standby screen may be automatically stored when a standby screen is changed to omit a redundant operation, thereby providing user convenience.

A standby screen and a configuration of an electronic device matching a context may be automatically changed, thereby reducing an unnecessary operation of a user.

Configuration information may be downloaded along with a standby screen from an external server, thus not requiring a separate configuration operation of a user.

When sharing a standby screen with an external electronic device, configuration information may also be shared, thus not requiring a separate configuration operation of a user.

BRIEF DESCRIPTION OF DRAWINGS

In describing the drawings, the same or like reference numerals may be used to refer to the same or like elements. The above and other aspects, features and advantages of certain embodiments of the present disclosure will be more apparent from the following detailed description, taken in conjunction with the accompanying drawings, in which.

DETAILED DESCRIPTION

Figure 1:
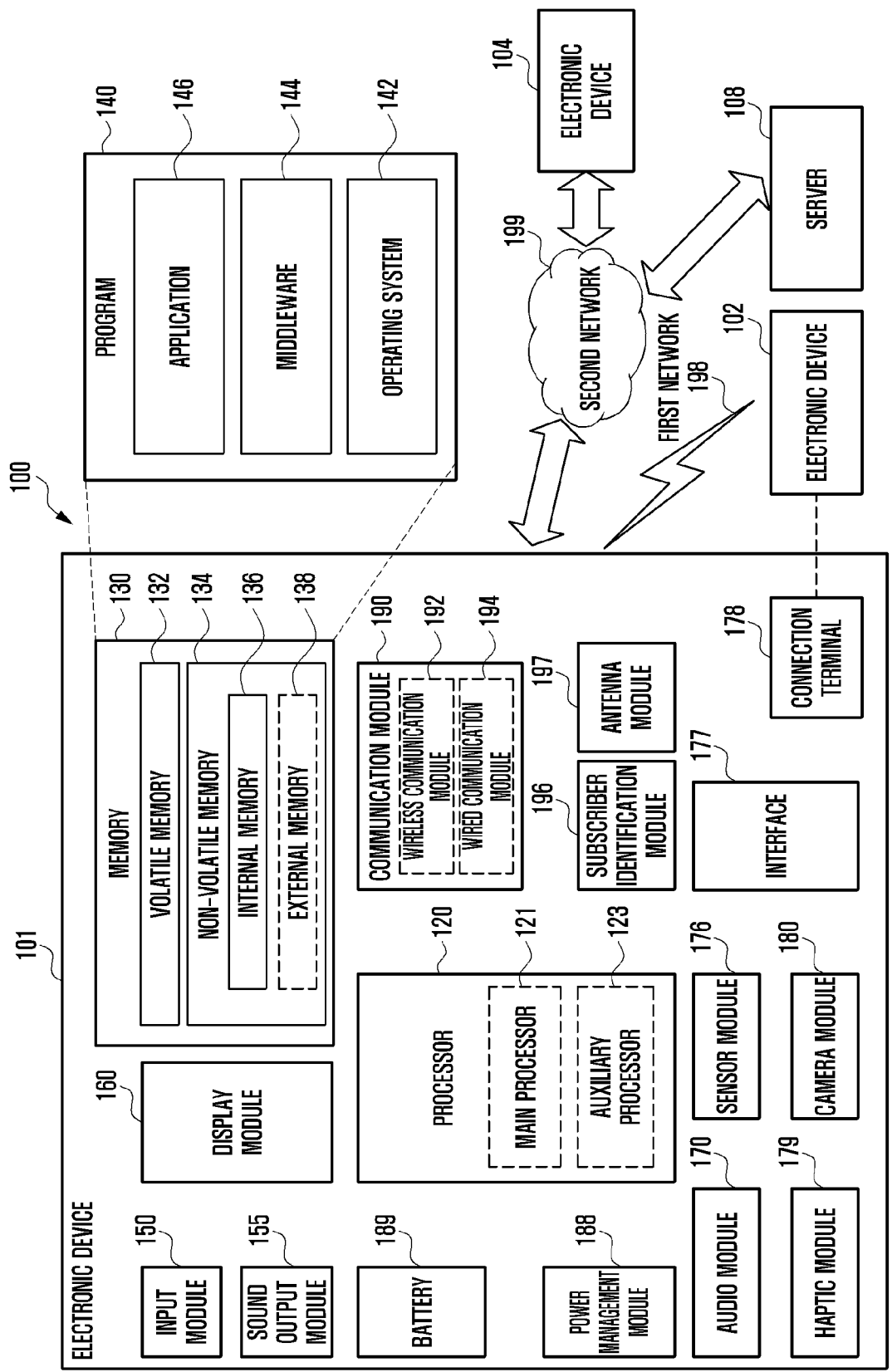
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g. electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
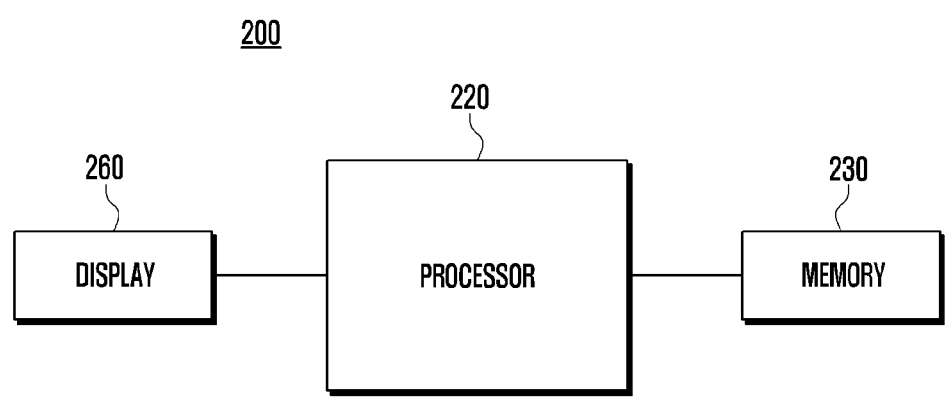
FIG. 2 is a block diagram of an electronic device according to various example embodiments.

FIG. 2 is a block diagram of an electronic device according to various example embodiments.

Referring to FIG. 2, the electronic device (e.g., the electronic device 101 of FIG. 1) 200 may include a processor (e.g., the processor 120 of FIG. 1) 220, a memory (e.g., the memory 130 of FIG. 1) 230, and/or a display (e.g., the display 160 of FIG. 1) 260. The components included in FIG. 2 are some of components included in the electronic device 200, and the electronic device 200 may further include various components as illustrated in FIG. 1.

The memory 230 may temporarily or non-temporarily store information related to a plurality of screens and/or configuration information about the electronic device 200.

For example, the information related to the plurality of screens may include a screen displayed on the display 260 when the electronic device 200 is in a standby state and/or a screen indicator indicating each screen.

The memory 230 may also temporarily or non-temporarily store mapping data obtained by mapping a standby screen and the configuration information about the electronic device.

According to an embodiment, the processor 220 may store mapping data including a first mapping table of the electronic device 200 in the memory 230. The first mapping table may include a standby screen field and/or a configuration field. The processor 220 may map a configuration to each corresponding standby screen in the mapping table. As illustrated in the disclosure, a first screen cell may correspond to a first configuration information cell, a second screen cell may correspond to a second configuration information cell, and a third screen cell may correspond to a third configuration information cell.

TABLE 1

| Standby screen | Configuration |
| --- | --- |
| [First screen cell] | [First configuration information cell] |
| [Second screen cell] | [Second configuration information cell] |
| [Third screen cell] | [Third configuration information cell] |
| ... | ... |

Table 1 is an example of the first mapping table stored in the memory 230 according to various embodiments. A standby screen indicator indicating each standby screen may be stored in [first screen cell], [second screen cell], and [third screen cell] corresponding to the standby screen field.

Configuration information about the electronic device corresponding to each standby screen may be stored in [first configuration information cell], [second configuration information cell], and [third configuration information cell] corresponding to the configuration field. For example, the configuration information may be various pieces of configuration information about the electronic device including activation/deactivation of various modes, such as a dark mode, a Do Not Disturb mode, an always-on display (AOD) mode, a battery saving mode, a vibration mode, a Bluetooth mode, and a position tracking mode, and/or a screen brightness, and a volume and/or a combination of pieces of configuration information.

The processor 220 may be connected, directly or indirectly, to the display 260, and may process information so that various pieces of information may be visually displayed on the display 260. The processor 220 may extract the standby screen stored in the memory 230 to output the screen on the display 260.

Figure 3:
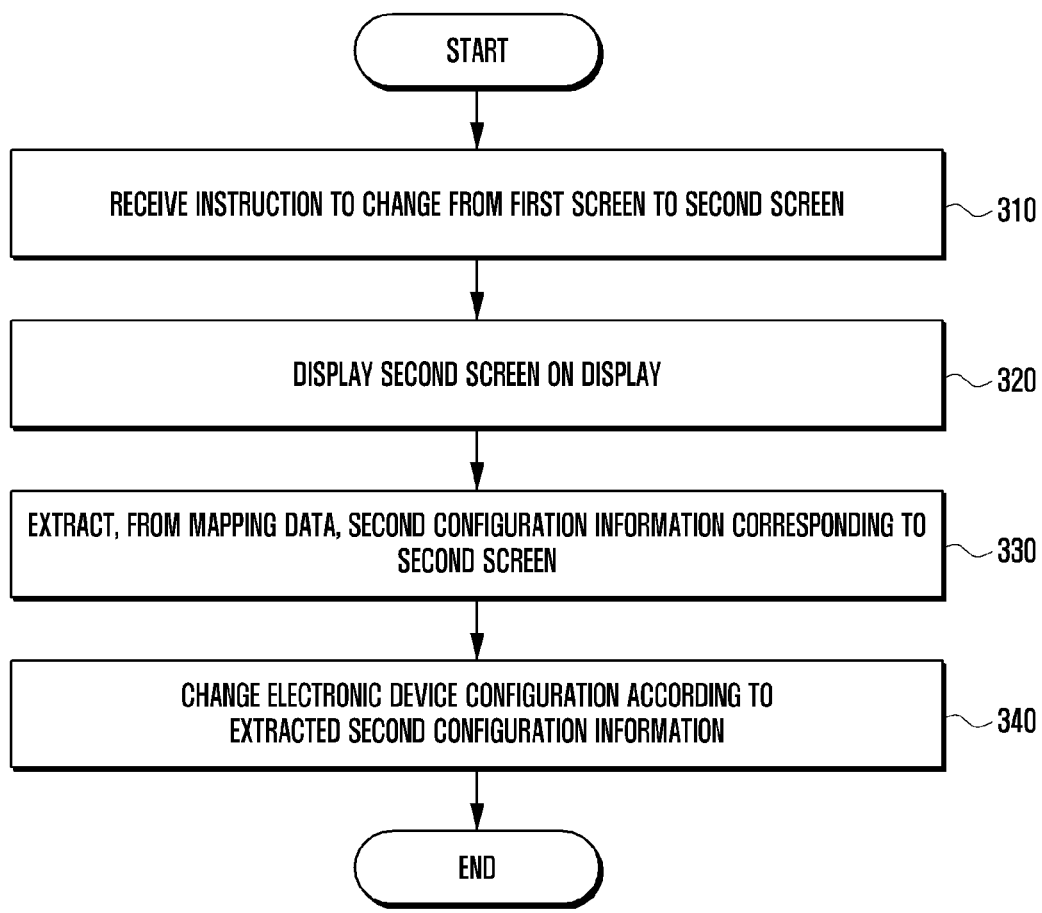
FIG. 3 is a flowchart illustrating a method in which a processor controls an electronic device to change a configuration of the electronic device as a standby screen is changed according to various example embodiments.

FIG. 3 illustrates a method in which a processor (e.g., the processor 220 of FIG. 2) controls an electronic device (e.g., the electronic device 200 of FIG. 2) to change a configuration of the electronic device as a standby screen is changed according to various example embodiments.

According to various embodiments, in operation 310, the processor 220 may receive an instruction to change a first screen to a second screen.

According to an embodiment, the first screen and/or the second screen may be screens displayed on a display 260 when the electronic device 200 is in a standby state.

According to an embodiment, the processor 220 may receive a change instruction by a user input. For example, the change instruction may include various types of user inputs, such as a swipe touch input on the display 260, an input of clicking a button provided on the electronic device 200, selection of a setting of the first screen in a configuration application, and a motion input of shaking the electronic device 200.

According to an embodiment, the processor 220 may receive an instruction to change a screen to display a screen corresponding to a context. For example, similar to an operation illustrated in FIG. 5A, the processor may receive an instruction to change to the second screen to display the second screen corresponding to a second context in response to detecting the second context.

According to various embodiments, in operation 320, the processor 220 may display the second screen on the display (e.g., the display 260 of FIG. 2). According to an embodiment, the processor 220 may extract the second screen stored in a memory 230 to display the second screen.

According to various embodiments, in operation 330, the processor 220 may extract second configuration information corresponding to the second screen from mapping data.

According to an embodiment, the processor 220 may retrieve the second configuration information corresponding to the second screen from a first mapping table stored in the memory (e.g., the memory 230 of FIG. 2). The processor 220 may extract the second configuration information stored in a second configuration information cell.

According to various embodiments, in operation 340, the processor 220 may change a configuration of the electronic device (e.g., the electronic device 200 of FIG. 2) according to the extracted second configuration information.

For example, the second configuration information may include activation/deactivation of various modes, such as a dark mode, a Do Not Disturb mode, an always-on display (AOD) mode, a battery saving mode, a vibration mode, a Bluetooth mode, and a position tracking mode, and/or a screen brightness, and a volume. The second configuration information may be a combination of values of configuration items.

Figure 4A:
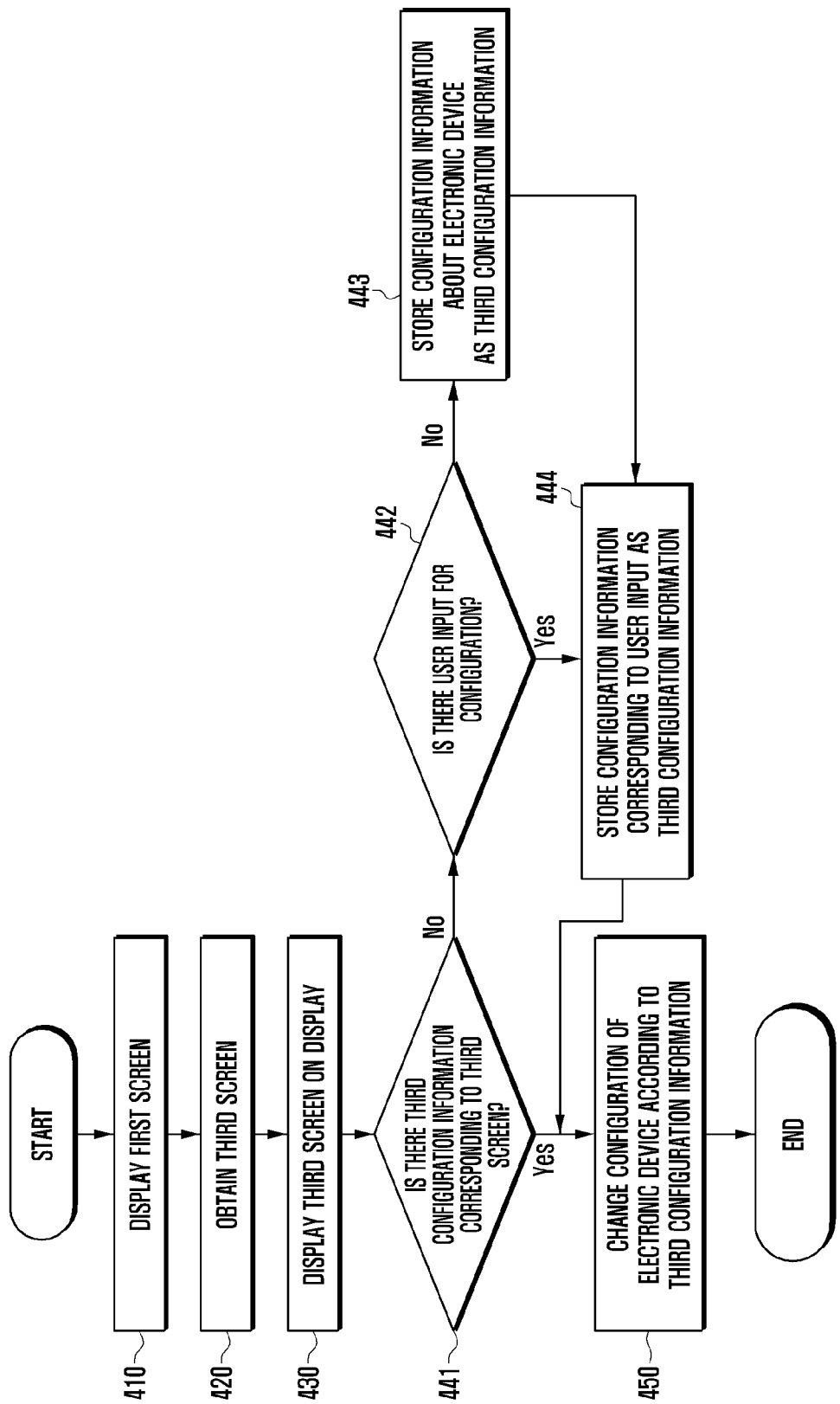
FIG. 4A is a flowchart illustrating a method in which a processor controls an electronic device as a new standby screen is obtained according to various example embodiments.

FIG. 4A is a flowchart illustrating a method in which a processor (e.g., the processor 220 of FIG. 2) controls an electronic device (e.g., the electronic device 200 of FIG. 2) as a new standby screen is obtained according to various example embodiments.

According to various embodiments, in operation 410, the processor 220 may display a first screen on a display (e.g., the display 260 of FIG. 2). The first screen may be a screen displayed on the display 260 when the electronic device 200 is in a standby state. According to an embodiment, the processor 220 may extract the first screen stored in a memory 230 to display the first screen.

According to various embodiments, in operation 420, the processor 220 may obtain a third screen. The third screen may be a screen layout displayed on the display 260 when the electronic device 200 is in the standby state.

According to an embodiment, the processor 220 may obtain information about the third screen from an external electronic device through a communication module (e.g., the communication module 190 of FIG. 1, comprising communication circuitry). For example, the processor 220 may receive the information about the third screen from an external electronic device (e.g., a mobile phone or a wearable device) via wireless communication (e.g., Bluetooth or Wi-Fi).

According to an embodiment, the processor 220 may obtain the information about the third screen from a server through the communication module (e.g., the communication module 190 of FIG. 1). For example, the processor 220 may download the information about the third screen from an external server (e.g., an app store) via wireless communication (e.g., Wi-Fi, a legacy cellular network, a 5G network, or a next-generation communication network).

According to an embodiment, the processor 220 may obtain the information about the third screen through an application. For example, the processor 220 may generate the information about the third screen through an application (e.g., an application that edits and/or generates a standby screen layout) installed in the electronic device 200.

According to an embodiment, the processor 220 may store the obtained information about the third screen in the memory (e.g., the memory 230 of FIG. 2). The information about the third screen may include the third screen and/or an indicator of the third screen.

According to an embodiment, the processor 220 may store the obtained indicator of the third screen in a third screen cell of a first mapping table stored in the memory 230.

According to various embodiments, in operation 430, the processor 220 may display the third screen on the display 260. According to an embodiment, the processor 220 may extract the third screen stored in the memory 230 to display the third screen.

According to various embodiments, in operation 441, the processor 220 may determine whether there is a third configuration corresponding to the third screen. According to an embodiment, the processor 220 may retrieve third configuration information corresponding to the third screen from the first mapping table stored in the memory 230. For example, the processor 220 may determine whether there is the information in a third configuration information cell.

According to various embodiments, in response to absence of the third configuration information (operation 441—N), the processor 220 may determine whether there is a user input for the third configuration corresponding to the third screen in operation 442. According to an embodiment, the processor 220 may display a screen for configuration on the display 260 to receive configuration information corresponding to the third screen from a user. The processor 220 may receive the third configuration information corresponding to the third screen from the user through the screen for configuration.

According to various embodiments, in response to absence of the user input (operation 442—N), the processor 220 may store current configuration information about the electronic device 200 as the third configuration information in operation 443. For example, the processor 220 may store a configuration value of the electronic device 200 before obtaining the third screen in the third configuration information cell of the first mapping table.

According to various embodiments, in response to presence of the user input (operation 442—Y), the processor 220 may store information corresponding to the user input as the third configuration information in operation 444. According to an embodiment, the processor 220 may store configuration information corresponding to the user input in the third configuration information cell of the first mapping table.

According to various embodiments, in operation 450, the processor 220 may change a configuration of the electronic device 200 according to the third configuration information. According to an embodiment, the processor 220 may retrieve the third configuration information cell from the first mapping table, and may change the configuration of the electronic device 200 according to the third configuration information stored in the third configuration information cell.

Figure 4B:
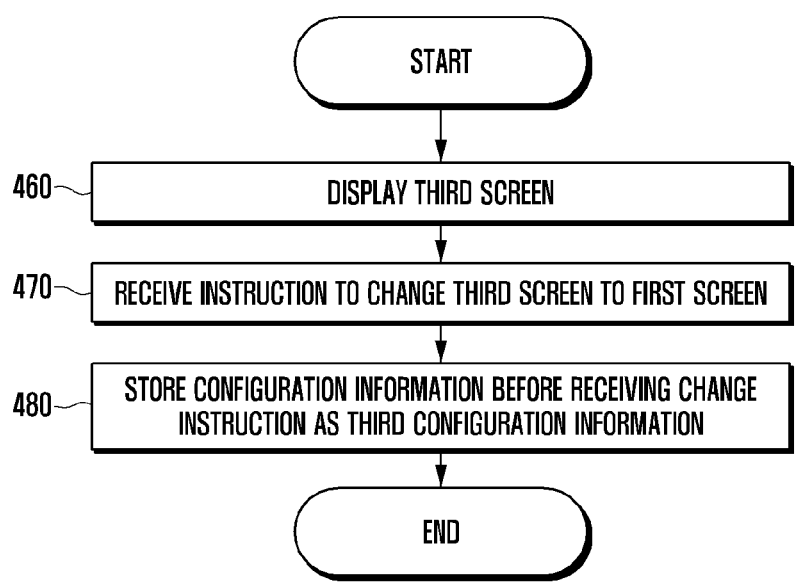
FIG. 4B is a flowchart illustrating a method in which a processor controls an electronic device as a standby screen is changed according to various example embodiments.

FIG. 4B is a flowchart illustrating a method in which a processor 220 controls an electronic device 200 as a standby screen is changed according to various example embodiments.

According to various embodiments, in operation 460, the processor 220 may display a third screen on a display 260. According to an embodiment, the processor 220 may extract the third screen stored in a memory 230 to display the third screen. According to various embodiments, in operation 470, the processor 220 may receive an instruction to change the third screen to a first screen.

According to an embodiment, the processor 220 may receive a change instruction by a user input. For example, the change instruction may include various types of user inputs, such as a swipe touch input on the display 260, an input of clicking a button provided on the electronic device 200, selection of a setting of the first screen in a configuration application, and a motion input of shaking the electronic device 200.

According to various embodiments, in operation 480, the processor 220 may store a current configuration value of the electronic device 200 before receiving the change instruction as third configuration information. For example, the processor 220 may store the configuration value of the electronic device 200 before receiving the change instruction in a third configuration information cell of a first mapping table. For example, when a configuration of the electronic device 200 is changed by a user before receiving the change instruction, the processor 220 may store a changed final configuration value in a third configuration information cell of a first mapping table.

According to another embodiment, the processor 220 may store changed configuration information as the third configuration information whenever the configuration of the electronic device is changed. For example, the processor 220 may store a changed configuration in the third configuration information cell of the first mapping table whenever the user changes the configuration of the electronic device 200.

Figure 4C:
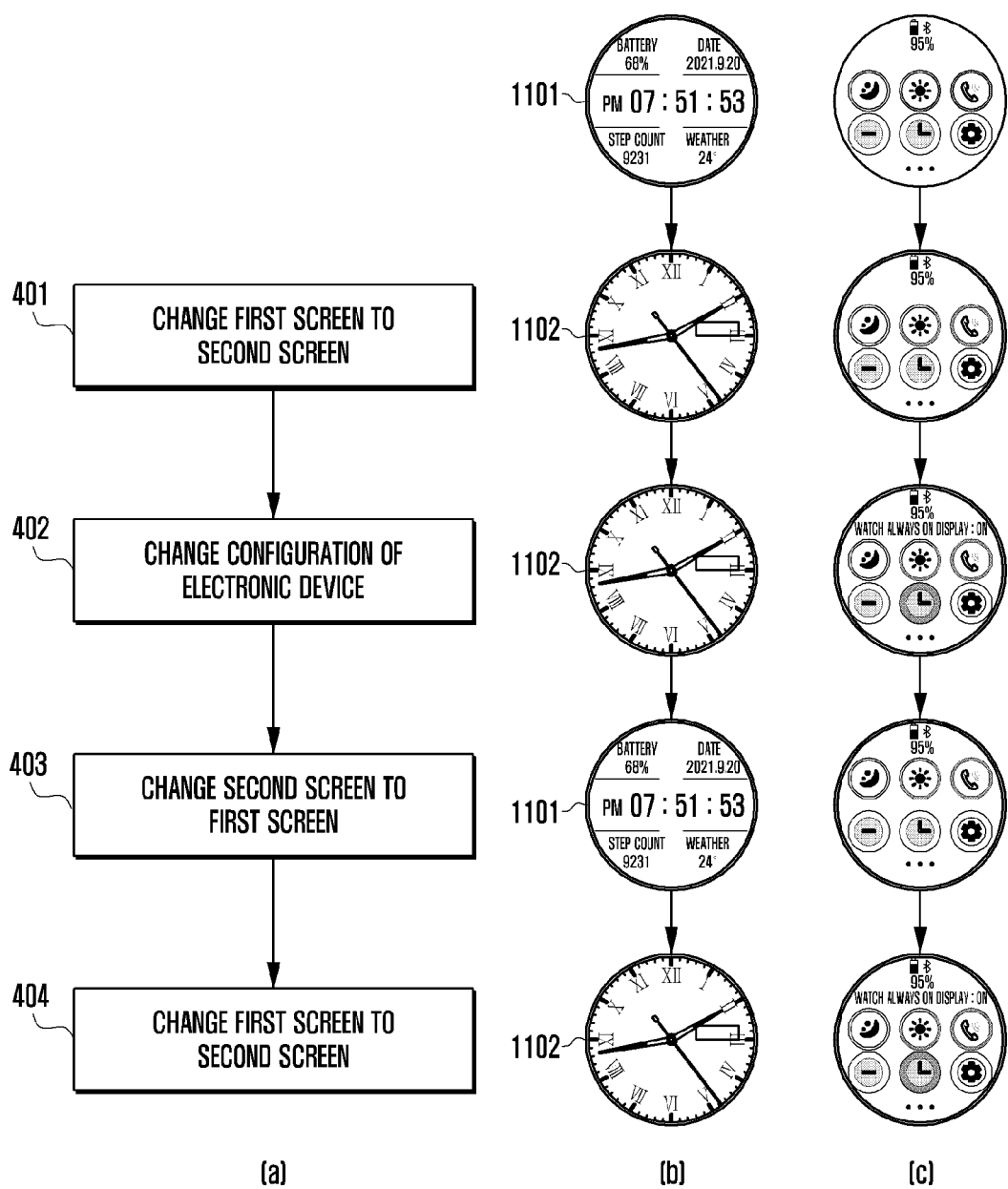
FIG. 4C illustrates an example in which a processor changes a configuration of an electronic device in response to a change of a standby screen of the electronic device according to various example embodiments.

FIG. 4C illustrates an example in which a processor changes a configuration of an electronic device in response to a change of a standby screen of the electronic device according to various example embodiments.

Part (a) illustrates the order of a command of a user for the electronic device 200, part (b) illustrates a screen according to the command of part (a), and part (c) shows that a configuration of the electronic device is changed according to the command of part (a).

TABLE 2

| Standby screen | Configuration |
| --- | --- |
| First screen (1101) | Brightness: 8 AOD: OFF |
| Second screen (1102) | |

Table 2 is an example of a first mapping table stored in a memory 230 before an operation according to the command of part (a). The electronic device 200 may be in a state of displaying a first screen 1101 on a display 260 and being configured according to first configuration information (Brightness: 8, AOD: OFF). According to an embodiment, the processor 220 may change the standby screen displayed on the display 260 from the first screen 1101 to a second screen 1102 according to a user command 401. The processor 220 may retrieve a second configuration corresponding to the second screen 1102 from the first mapping table. The processor 220 may store a configuration before changing to the second screen as it is in a second configuration information cell in response to absence of a value in the second configuration information cell corresponding to the second screen 1102 (e.g., operation 443 of FIG. 4A).

TABLE 3

| Standby screen | Configuration |
| --- | --- |
| First screen (301) | Brightness: 8 AOD: OFF |
| Second screen (302) | Brightness: 8 AOD: OFF |

Table 3 is an example of a first mapping table resulting from an operation of the processor 220 according to the command 401. According to an embodiment, the processor 220 may change the configuration of the electronic device according to a user command 402. The processor 220 may change the configuration of the electronic device 200 according to a use input (e.g., Brightness: −4, AOD: ON). According to an embodiment, the processor 220 may change the standby screen displayed on the display 260 from the second screen 1102 to the first screen 1101 according to a user command 403. The processor 220 may store a configuration value of the electronic device 200 before receiving a change instruction in the second configuration information cell of the first mapping table (e.g., operation 480 of FIG. 4B).

TABLE 4

| Standby screen | Configuration |
| --- | --- |
| First screen | Brightness: 8<br>AOD: OFF |
| Second screen | Brightness: 4<br>AOD: ON |

Table 4 is an example of a first mapping table resulting from an operation of the processor 220 according to the command 403. The processor 220 may retrieve a first configuration corresponding to the first screen 1101 from the first mapping table, and may change the configuration of the electronic device 200, based on first configuration information (Brightness: 8, AOD: OFF). According to various embodiments, the processor 220 may change the first screen 1101 to the second screen 1102 according to a user command 404. The processor 220 may retrieve a second configuration corresponding to the second screen 1102, and may change the configuration of the electronic device 200, based on a second configuration information cell value (Brightness: 4, AOD: ON).

Figure 4D:
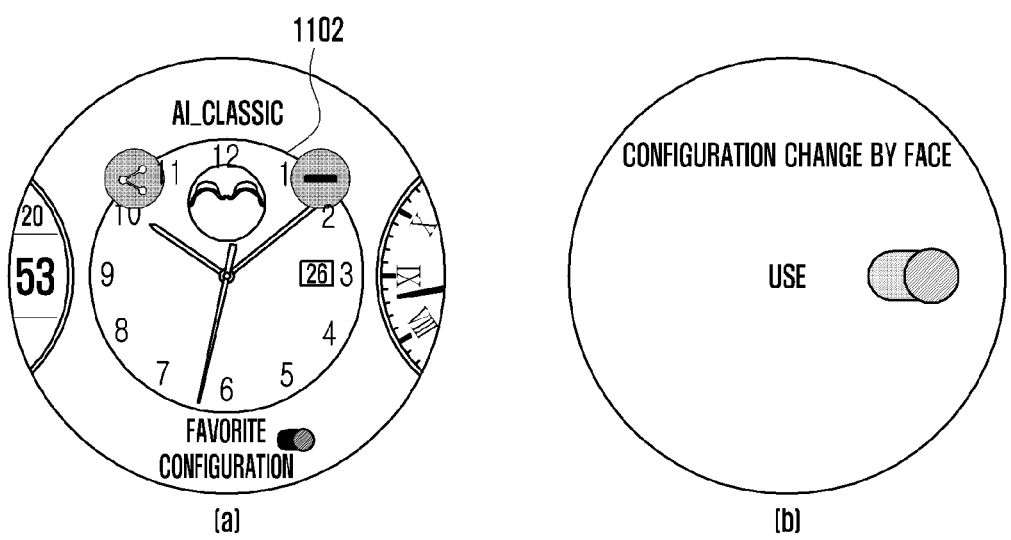
FIG. 4D illustrates an example of a screen for configuring whether to activate a mode of changing a configuration corresponding to a standby screen according to various example embodiments.

FIG. 4D illustrates an example of a screen for configuring whether to activate a mode of changing a configuration corresponding to a standby screen according to various example embodiments.

To configure whether to activate a mode of changing a configuration corresponding to a standby screen, a processor 220 may provide a screen for configuration whether to activate a mode of changing a configuration corresponding to each standby screen as shown in part (a). A user may activate or deactivate the mode of changing the configuration corresponding to each standby screen (e.g., a second screen 1102) by selecting an icon (e.g., favorite configuration ON/OFF icon) on the screen shown in part (a).

In addition, to configure whether to activate the mode of changing the configuration corresponding to the standby screen, the processor 220 may provide a screen for configuring whether to activate a mode for changing a configuration of all standby screens as shown in part (b). The user may activate or deactivate the mode of changing the configuration of all standby screens by selecting an icon (e.g., use ON/OFF icon of configuration change by face on the screen shown in part (b).

Figure 5A:
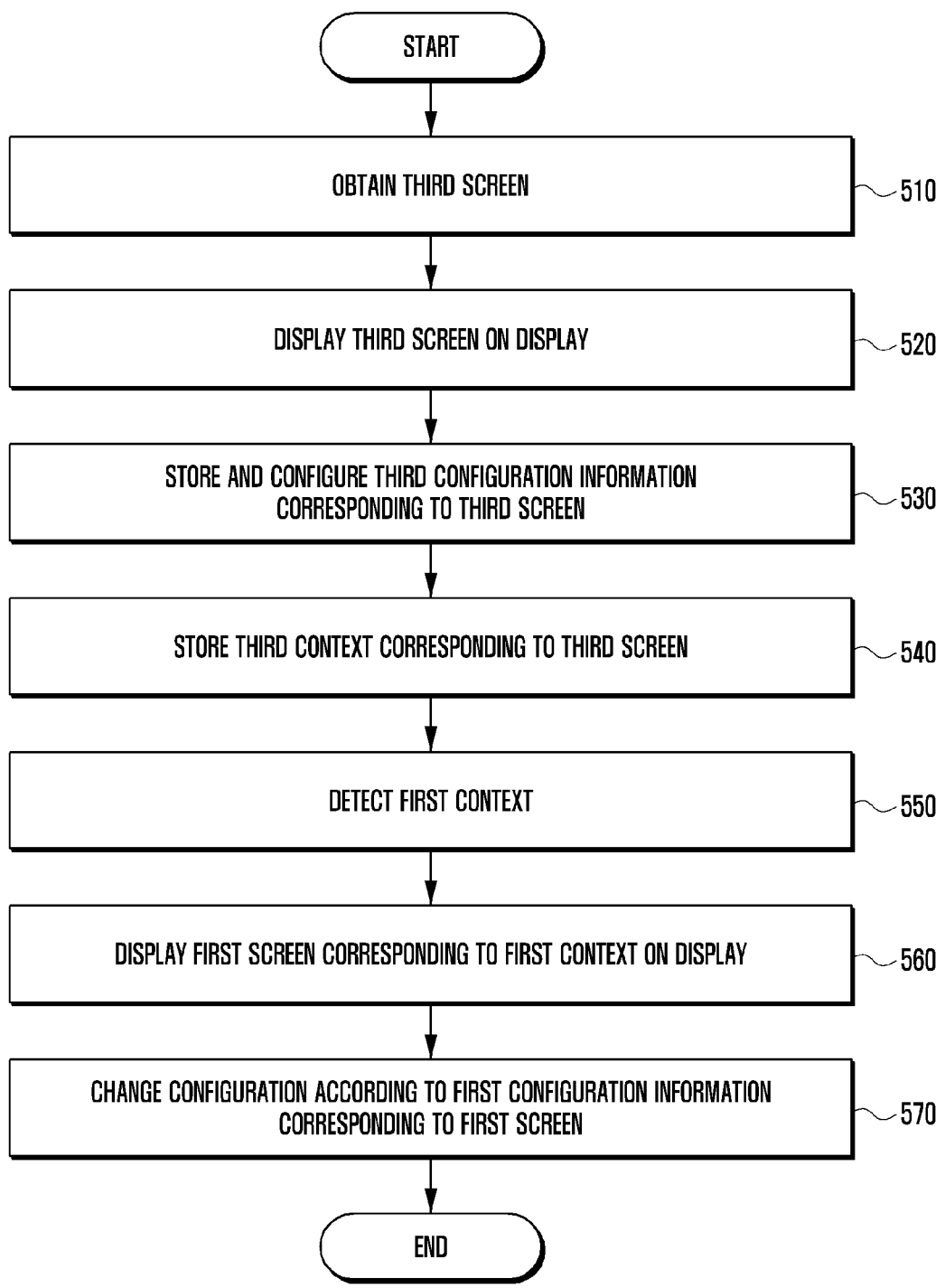
FIG. 5A is a flowchart illustrating a method in which a processor controls an electronic device when a standby screen is obtained according to various example embodiments.

FIG. 5A is a flowchart illustrating a method in which a processor (e.g., the processor 220 of FIG. 2) controls an electronic device (e.g., the electronic device 200 of FIG. 2) when a standby screen is obtained according to various example embodiments.

According to an embodiment, a memory (e.g., the memory 230 of FIG. 2) may temporarily or non-temporarily store context information about the electronic device 200.

The context information may include, for example, information in a form of a combination of various conditions and/or a context indicator. A context may be information related to a usage environment of a user including when waking up, before going to sleep, when going to bed, work, home, going to work, leaving work, school, charging, meeting, being exercising, being driving, and weather. The processor 220 may determine a context by using various pieces of information, such as information (e.g., a position, an operation, temperature, and humidity) collected by a sensor module (e.g., the sensor module 176 of FIG. 1, comprising at least one sensor), information (e.g., a connected Wi-Fi AP) collected by a communication module (e.g., the communication module 190 of FIG. 1), information (e.g., weather) obtained from an external device and/or an external server, and time.

The memory 230 may temporarily or non-temporarily store a second mapping table in which a context and a standby screen are mapped.

According to an embodiment, the processor 220 may store mapping data including the second mapping table of the electronic device 200 in the memory 230. The second mapping table may include a context field and/or a standby screen field. The processor 220 may map a standby screen to each corresponding context in the second mapping table. As illustrated in the disclosure, a first context cell may correspond to a first screen cell, a second context cell may correspond to a second screen cell, and a third context cell may correspond to a third screen cell.

TABLE 5

| Context | Standby screen |
| --- | --- |
| [First context cell]<br>[Second context cell]<br>[Third context cell]<br>... | [First screen cell]<br>[Second screen cell]<br>[Third screen cell]<br>... |

Table 5 is an example of the second mapping table stored in the memory 230 according to various embodiments. A context indicator corresponding to each standby screen may be stored in [first context cell], [second context cell], and [third context cell] corresponding to the context field. A standby screen indicator may be stored in [first screen cell], [second screen cell], and [third screen cell] corresponding to the standby screen field. According to various embodiments, in operation 510, the processor 220 may obtain a third screen. According to an embodiment, the third screen may be a screen displayed on a display 260 when the electronic device 200 is in a standby state.

According to an embodiment, the processor 220 may obtain information about the third screen from an external electronic device through the communication module (e.g., the communication module 190 of FIG. 1). For example, the processor 220 may receive the information about the third screen from the external electronic device (e.g., a mobile phone or a wearable device) via wireless communication (e.g., Bluetooth or Wi-Fi).

According to an embodiment, the processor 220 may obtain the information about the third screen from a server through the communication module (e.g., the communication module 190 of FIG. 1). For example, the processor 220 may download the information about the third screen from the external server via wireless communication (e.g., Wi-Fi, a legacy cellular network, a 5G network, a next-generation communication networks, or the Internet).

According to an embodiment, the processor 220 may obtain the information about the third screen through an application. For example, the processor 220 may generate the information about the third screen through an application (e.g., an application that edits and/or generates a standby screen layout) installed in the electronic device 200.

According to an embodiment, the processor 220 may store the obtained information about the third screen in a memory (e.g., the memory 230 of FIG. 2). The information about the third screen may include the third screen and/or an indicator of the third screen.

According to an embodiment, the processor 220 may store the obtained indicator of the third screen in a third screen cell of a first mapping table and/or the second mapping table stored in the memory 230.

According to various embodiments, in operation 520, the processor 220 may display the third screen on the display (e.g., the display 260 of FIG. 2). According to an embodiment, the processor 220 may extract the third screen stored in the memory 230 to display the third screen on the display 260.

According to various embodiments, in operation 530, the processor 220 may store and configure third configuration information corresponding to the third screen.

According to an embodiment, the processor 220 may receive the third configuration information corresponding to the third screen from the user. The processor 220 may display a screen for configuration on the display 260 to receive the third configuration information from the user. The processor 220 may receive the third configuration information corresponding to the third screen from the user through the screen for configuration.

According to an embodiment, the processor 220 may obtain the third configuration information corresponding to the third screen while obtaining the third screen. For example, when the third screen is received from the external electronic device, the third configuration information corresponding to the third screen may be received together with the third screen. In another example, when the third screen is downloaded from the external server, the third configuration information corresponding to the third screen may be downloaded together with the third screen.

According to an embodiment, the processor 220 may store the third configuration information in the memory 230. The third configuration information may be a combination of various pieces of configuration information about the electronic device including activation/deactivation of various modes, such as a dark mode, a Do Not Disturb mode, an always-on display (AOD) mode, a battery saving mode, a vibration mode, a Bluetooth mode, and a position tracking mode, and/or a screen brightness, and a volume. According to an embodiment, the processor 220 may store the third configuration information in a third configuration information cell of the first mapping table.

According to an embodiment, the processor 220 may change a configuration of the electronic device 200, based on the third configuration information stored in the memory 230.

According to various embodiments, in operation 540, the processor 220 may configure and store a third context corresponding to the third screen.

According to an embodiment, the processor 220 may receive third context information corresponding to the third screen from the user. The processor 220 may display a screen for configuration on the display 260 to receive the third context information from the user. The processor 220 may receive the third context information corresponding to the third screen from the user through the screen for configuration.

According to an embodiment, the processor 220 may configure the third context information corresponding to the third screen while obtaining the third screen. For example, when the third screen is received from the external electronic device, the third context information corresponding to the third screen may be received together with the third screen. In another example, when the third screen is downloaded from the external server, the third context information corresponding to the third screen may be downloaded together with the third screen.

According to an embodiment, the processor 220 may store the third context information in the memory 230. The third context information may include a combination of various pieces of information (e.g., a specific time, a specific place, brightness of external lighting, and weather) corresponding to the third context (e.g., when waking up, before going to sleep, when going to bed, work, home, going to work, leaving work, school, charging, meeting, being exercising, being driving, and weather) and/or a third context indicator. According to an embodiment, the processor 220 may store the third context indicator in the third context cell of the second mapping table.

According to various embodiments, in operation 550, the processor 220 may detect a first context. According to an embodiment, the processor 220 may detect the first context by using various pieces of information, such as information (e.g., a position, an operation, temperature, and humidity) collected by the sensor module 176, information (e.g., a connected Wi-Fi AP) collected by the communication module 190, information (e.g., weather) obtained from the external device and/or the external server, and time.

According to various embodiments, in operation 560, the processor 220 may display a first screen corresponding to the first context on the display.

According to an embodiment, the processor 220 may retrieve the first screen cell corresponding to the first context from the second mapping table stored in the memory 230. The processor 220 may extract the first screen stored in the memory 230, based on information stored in the first screen cell. For example, the processor 220 may extract the first screen stored in the memory 230, based on an indicator of the first screen stored in the first screen cell. The processor 220 may display the first screen on the display 260, based on the extracted first screen.

According to various embodiments, in operation 570, the processor 220 may change the configuration of the electronic device according to first configuration information corresponding to the first screen.

According to an embodiment, the processor 220 may retrieve a first configuration information cell corresponding to the first screen from the first mapping table stored in the memory. The processor 220 may extract the first configuration information stored in the first configuration information cell. The processor 220 may change the configuration of the electronic device 200, based on the extracted first configuration information.

Figure 5B:
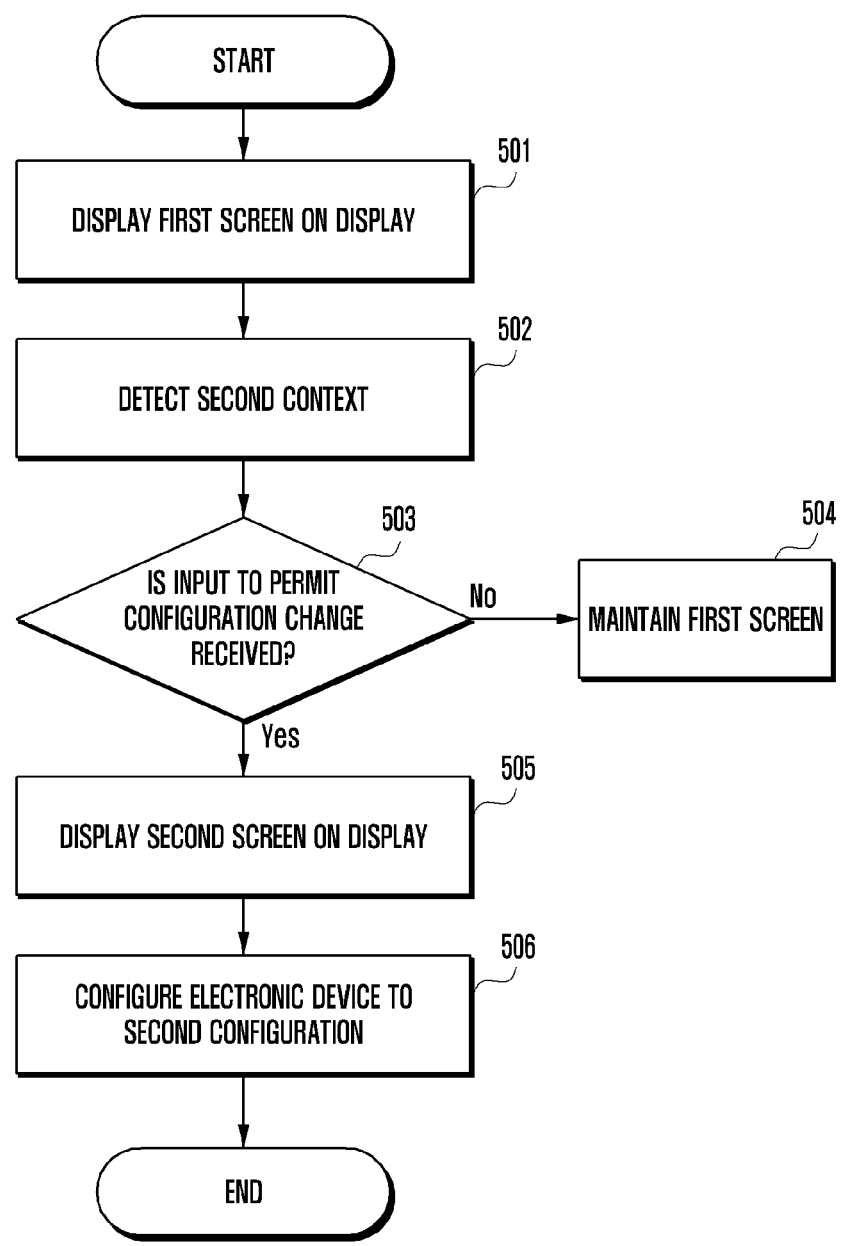
FIG. 5B is a flowchart illustrating a method in which a processor controls an electronic device according to a context according to various example embodiments.

FIG. 5B is a flowchart illustrating a method in which a processor controls an electronic device according to a context according to various example embodiments.

According to various embodiments, in operation 501, the processor 220 may display a first screen on a display. According to an embodiment, the first screen may be a screen displayed on the display 260 when the electronic device 200 is in a standby state.

According to various embodiments, in operation 502, the processor 220 may detect a second context.

According to an embodiment, second context information may include a combination of various pieces of information (e.g., a specific time, a specific place, brightness of external lighting, and weather) corresponding to the second context (e.g., when waking up, before going to sleep, when going to bed, work, home, going to work, leaving work, school, charging, meeting, being exercising, being driving, and weather) and/or a second context indicator.

According to an embodiment, the processor 220 may detect the second context by using various pieces of information, such as information (e.g., a position, an operation, temperature, and humidity) collected by a sensor module 176, information (e.g., a connected Wi-Fi AP) collected by a communication module 190, information (e.g., weather) obtained from an external device and/or an external server, and time.

According to various embodiments, in operation 503, the processor 220 may receive an input to permit a change of a configuration of the electronic device from a user.

According to an embodiment, the processor 220 may display a screen for input on the display 260 to receive an input on whether to permit the change of the configuration of the electronic device from the user. According to an embodiment, the processor 220 may receive the input to permit the change of the configuration by a user input. For example, the input to permit the change may include various types of user inputs, such as a swipe touch input on the display 260, an input of clicking a button provided on the electronic device 200, and a motion input of shaking the electronic device 200.

According to another embodiment, in operation 503, the processor 220 may configure a default mode as permitting the change of the configuration of the electronic device to permit the change of the configuration of the electronic device without a user input.

According to various embodiments, in operation 504, the processor 220 may maintain the first screen to be displayed on the display 260 in response to not receiving the input to permit the change.

According to various embodiments, in operation 505, the processor 220 may display a second screen corresponding to the second context on the display 260 in response to receiving the input to permit the change.

According to an embodiment, the processor 220 may retrieve a second screen cell corresponding to the second context from a second mapping table stored in a memory 230. The processor 220 may extract the second screen stored in the memory 230, based on information stored in the second screen cell. For example, the processor 220 may extract the second screen stored in the memory 230, based on an indicator of the second screen stored in the second screen cell. The processor 220 may display the extracted second screen on the display 260.

According to various embodiments, in operation 506, the processor 220 may configure the electronic device 200, based on second configuration information corresponding to the second screen.

According to an embodiment, the processor 220 may retrieve a second configuration information cell corresponding to the second screen from a first mapping table stored in the memory 230. The processor 220 may extract the second configuration information stored in the second configuration information cell. The processor 220 may change the configuration of the electronic device 200, based on the extracted second configuration information.

Figure 5C:
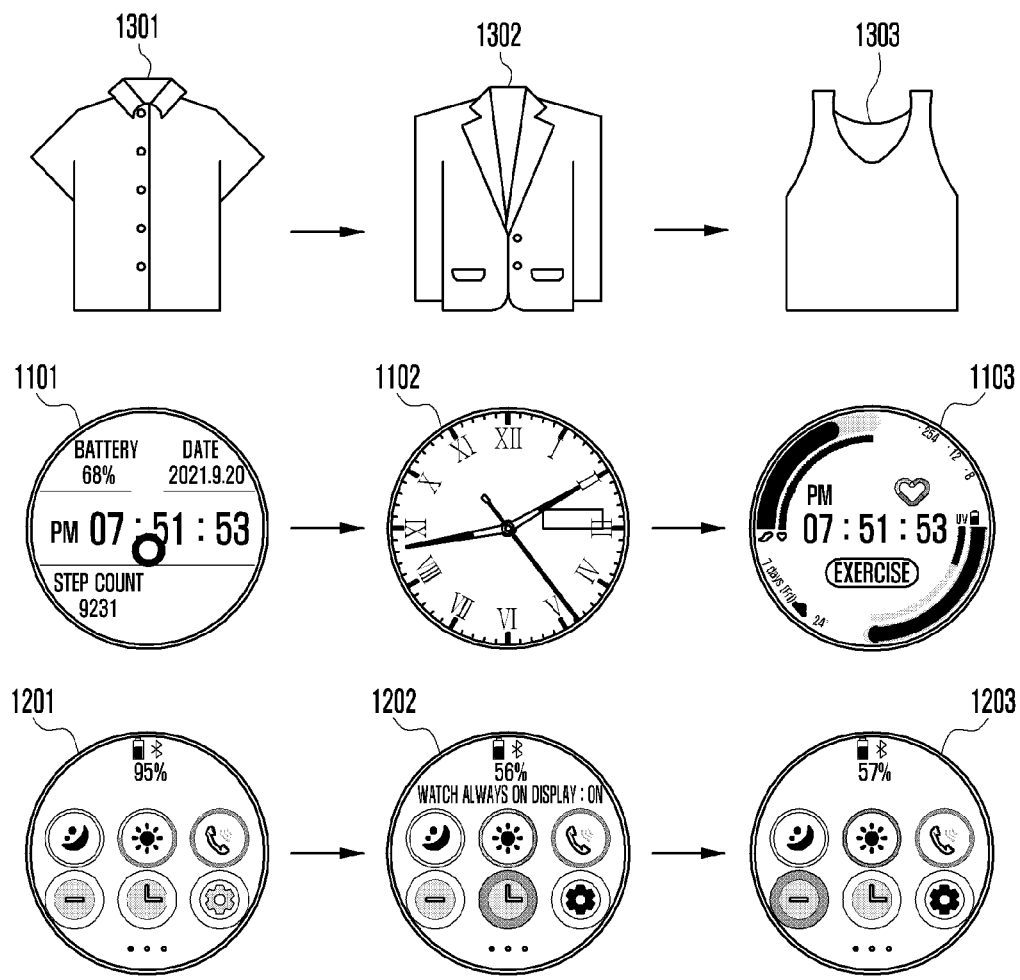
FIG. 5C illustrates an example in which a processor controls an electronic device according to a context according to various example embodiments.

FIG. 5C illustrates an example in which a processor 220 controls an electronic device 200 according to a context according to various example embodiments.

According to various embodiments, the processor 220 may detect a first context 1301. For example, the first context 1301 may be a context of an environment in which a user uses the electronic device 200 at home. According to an embodiment, the processor 220 may detect the first context 1301, based on information (e.g., current time and position) detected by a sensor module (e.g., the sensor module 176 of FIG. 1). For example, in a case where the sensor module 176 detects that the current time is Saturday or Sunday and the position (e.g., based on a GPS and/or connected Wi-Fi AP) is the user's home, the processor 220 may determine the case as an environment of the first context 1301.

According to various embodiments, the processor 220 may display a first screen 1101 corresponding to the first context 1301 on a display.

According to an embodiment, the processor 220 may retrieve a first screen cell corresponding to the first context 1301 from a second mapping table stored in a memory 230. The processor 220 may extract the first screen stored in the memory 230, based on information stored in the first screen cell. For example, the processor 220 may extract the first screen stored in the memory 230, based on an indicator of the first screen stored in the first screen cell. The processor 220 may display the first screen 1101 on the display 260, based on the extracted first screen. For example, the first screen 1101 may be a digital watch screen displaying the current time in a digital style. Accordingly, the user may easily check the current time through the electronic device 200.

According to various embodiments, the processor 220 may change a configuration of the electronic device 200 according to first configuration information corresponding to the first screen 1101. According to an embodiment, the processor 220 may retrieve a first configuration information cell corresponding to the first screen 1101 from a first mapping table stored in the memory 230. The processor 220 may extract the first configuration information 1201 stored in the first configuration information cell. The processor 220 may change the configuration of the electronic device 200, based on the extracted first configuration information 1201. For example, the first configuration information 1201 may be a configuration set in which a night mode, a Do Not Disturb mode, and an AOD mode are deactivated and brightness is 8.

According to various embodiments, the processor 220 may detect a second context 1302. For example, the second context 1302 may be a context of an environment in which the user uses the electronic device 200 in an office. According to an embodiment, the processor 220 may detect the second context 1302, based on information (e.g., current time and position) detected by the sensor module 176. For example, in a case where the sensor module 176 detects that the current time is within a range between 9:00 and 6:00 on weekdays and the position (e.g., based on the GPS and/or connected Wi-Fi AP) is the user's office, the processor 220 may determine the case as an environment of the second context 1302.

According to various embodiments, the processor 220 may display a second screen 1102 corresponding to the second context 1302 on the display 260. For example, the second screen 1102 may be a classic-mode screen displaying the current time in an analog style. Accordingly, the user may wear the electronic device 200 displaying a screen matching a fashion style of the user.

According to various embodiments, the processor 220 may change the configuration of the electronic device 200 according to second configuration information 1202 corresponding to the second screen 1102. For example, the second configuration information 1202 may be a configuration set in which the night mode and the Do Not Disturb mode are deactivated, the AOD mode is activated, and the brightness is 4.

According to various embodiments, the processor 220 may detect a third context 1303. For example, the third context 1303 may be a context of an environment in which the user uses the electronic device 200 while exercising. According to an embodiment, the processor 220 may detect the third context 1303, based on information (e.g., the user's heart rate, motion, and position) detected by the sensor module 176. For example, in a case where the sensor module 176 detects that the user's heart rate is a specified value or greater, the motion is running, and the position is a park, the processor 220 may determine the case as an environment of the third context 1303.

According to various embodiments, the processor 220 may display a third screen 1103 corresponding to the third context 1303 on the display 260. For example, the third screen 1103 may be an exercise-mode screen displaying information including time, calories, the number of steps, and weather.

According to various embodiments, the processor 220 may change the configuration of the electronic device 200 according to third configuration information 1203 corresponding to the third screen 1103. For example, the third configuration information 1203 may be a configuration set in which the night mode and the AOD mode are deactivated, the Do Not Disturb mode is activated, and the brightness is 10.

Figure 6A:
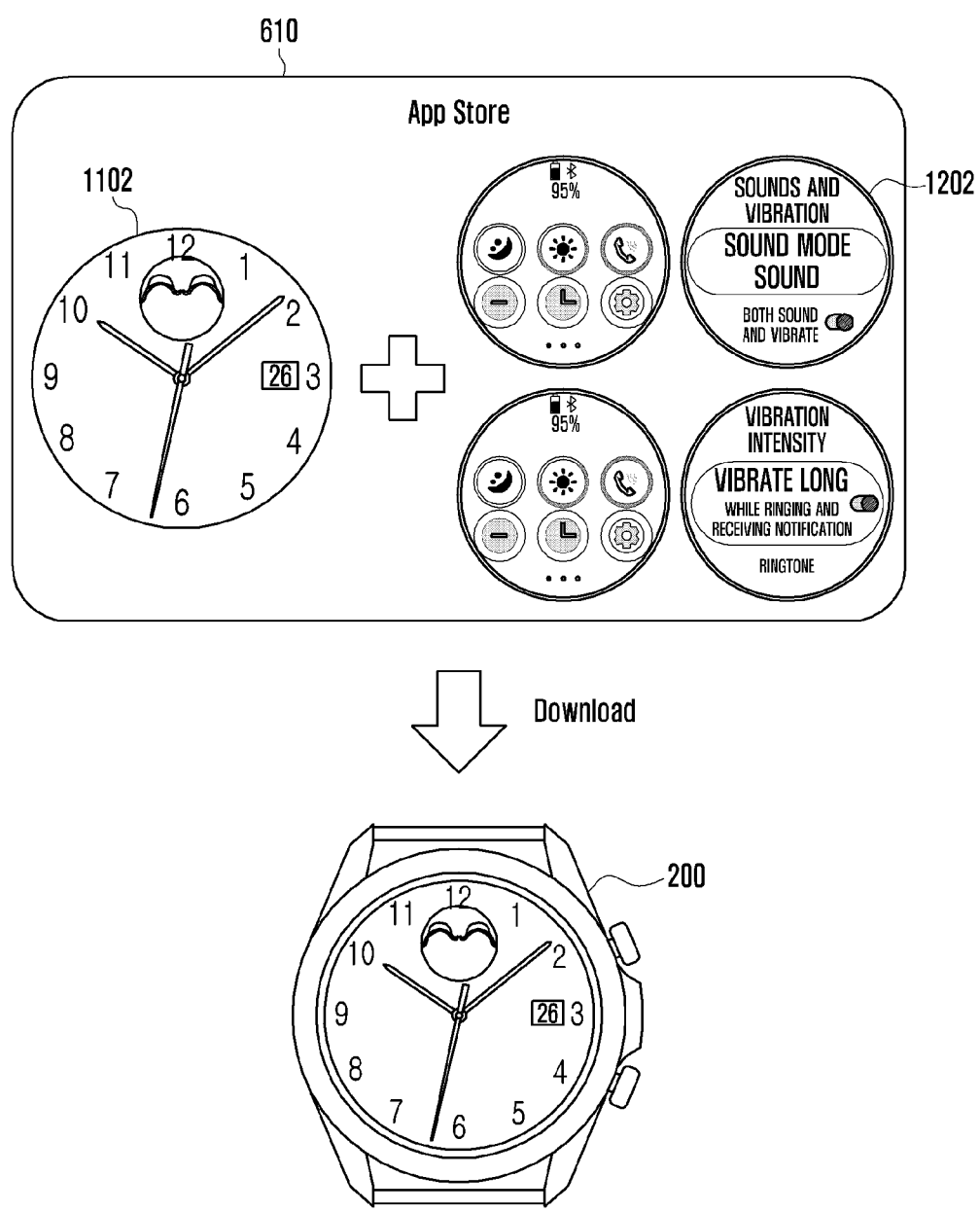
FIG. 6A illustrates an example in which a processor obtains a screen and configuration information from an external server according to various example embodiments.

FIG. 6A illustrates an example in which a processor (e.g., the processor 220 of FIG. 2) obtains a screen and configuration information from an external server according to various example embodiments.

According to an embodiment, the processor 220 may obtain a second screen 1102 from a server 610 through a communication module (e.g., the communication module 190 of FIG. 1, comprising communication circuitry). According to an embodiment, the processor 220 may download second configuration information 1202 corresponding to the second screen together with the second screen 1102 from the external server 610.

For example, the processor 220 may download the second screen 1102 and/or the second configuration information 1202 from the external server 610 through wireless communication (e.g., Wi-Fi, a legacy cellular network, a 5G network, or a next-generation communication network). The external server 610 may be a server that provides an application software download service (e.g., an app store).

Figure 6B:
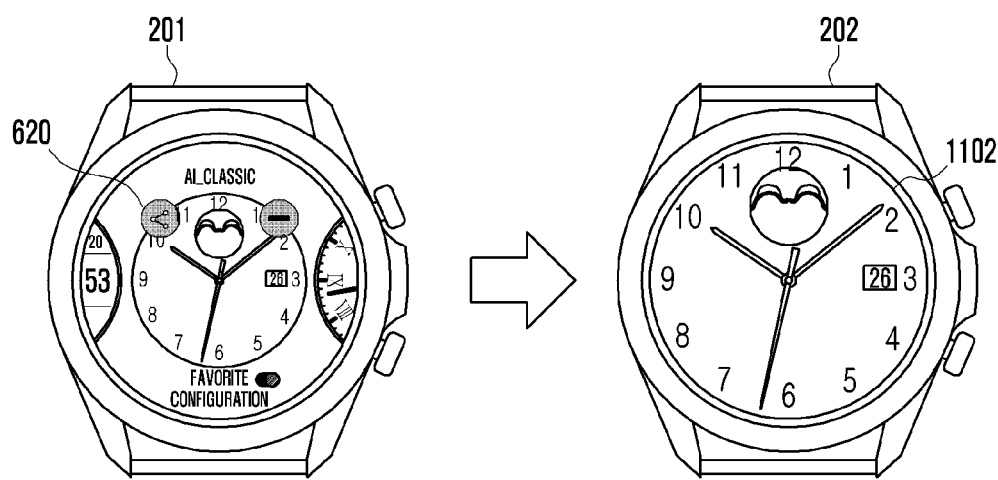
FIG. 6B illustrates an example in which a processor obtains a screen and configuration information from an external electronic device according to various example embodiments.

FIG. 6B illustrates an example in which a processor obtains a screen and configuration information from an external electronic device according to various example embodiments.

According to an embodiment, the processor 220 may obtain a second screen 1102 from the external electronic device 201 through a communication module 190. According to an embodiment, the processor 220 may obtain second configuration information 1202 corresponding to the second screen together with the second screen 1102 from the external electronic device 201.

For example, the processor 220 may receive the second screen 1102 and/or the second configuration information 1202 from the external electronic device (e.g., a mobile phone or a wearable device) 201 through wireless communication (e.g., Bluetooth or Wi-Fi).

According to an embodiment, a user may transmit information about the second screen 1102 and/or the second configuration information corresponding to the second screen 1102 to the electronic device 202 by selecting the second screen 1102 on the external electronic device 201 and selecting a share icon 620.

Figure 7:
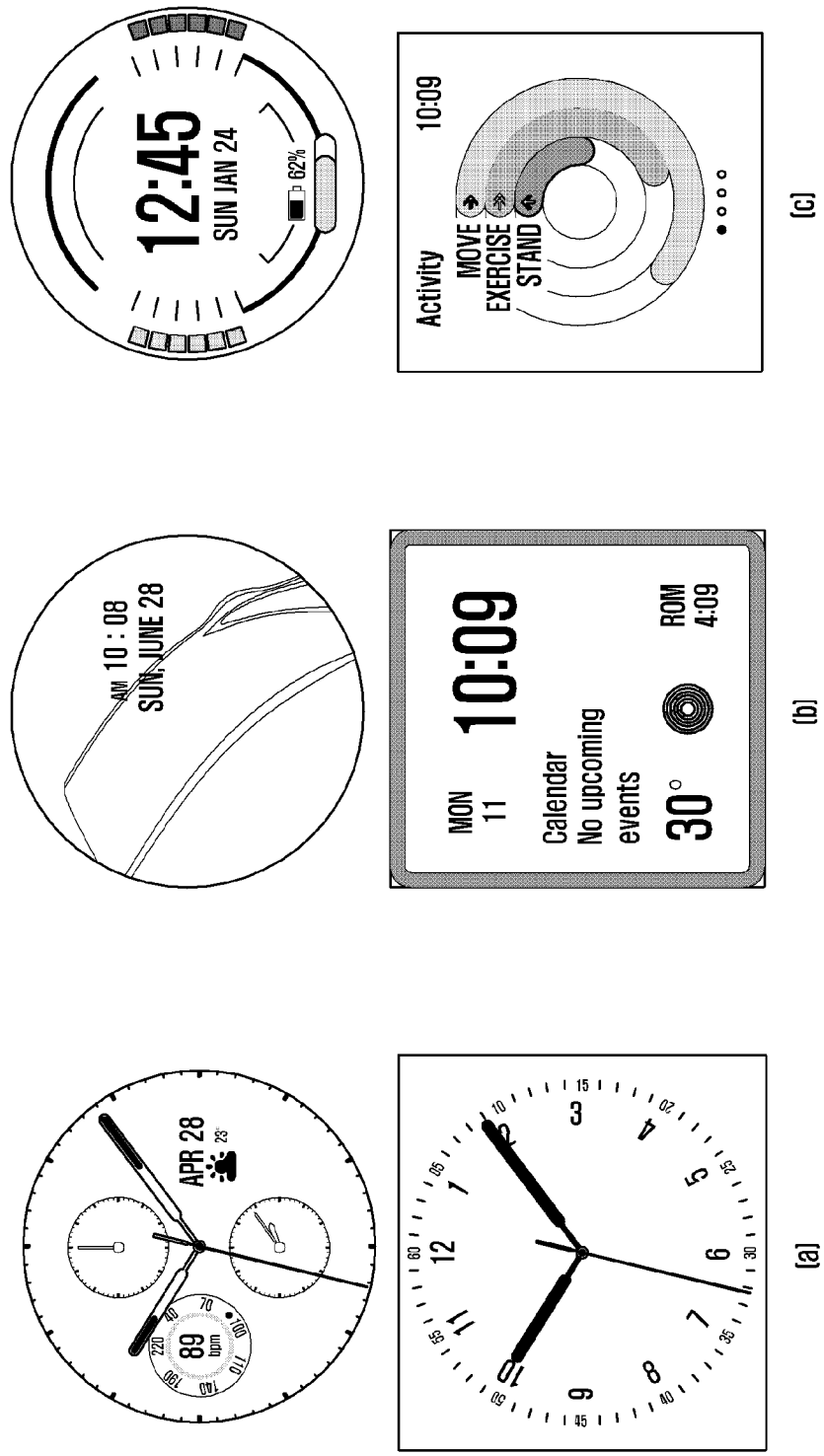
FIGS. 7(a)-(c) illustrates an example in which a processor configures configuration information corresponding to a screen in an electronic device according to various example embodiments.

FIG. 7 illustrates an example in which a processor configures configuration information corresponding to a screen in an electronic device according to various example embodiments.

According to various embodiments, the processor (e.g., the processor 220 of FIG. 2) may change a configuration of the electronic device (e.g., the electronic device 200 of FIG. 2) according to a change of a standby screen.

When displaying an analog-style standby screen as shown in part (a), the processor 220 may configure the electronic device 200 to silence a notification (silent mode: ON) when an event occurs, not to display information about the event on a watch device (notification: OFF), and to continuously display time information on a display without turning off the time information (AOD: ON). Accordingly, a user may wear the electronic device 200 continuously displaying a screen of an analog watch.

When displaying a digital-style standby screen as shown in part (b), the processor 220 may configure the electronic device 200 to give a notification (silent mode: OFF) when an event occurs, to display information about the event (notification: ON), and to turn off a screen when the electronic device is not used for a certain time (AOD: OFF). Accordingly, the user may use various functions of the electronic device 200.

When displaying an exercise-mode standby screen as shown in part (c), the processor 220 may configure the electronic device 200 not to receive a call/text during exercise (Do Not Disturb mode: ON) and to save a battery (battery saving mode: ON). Accordingly, the user may concentrate on the exercise.

These examples are some of various embodiments configurable by the processor 220, and the disclosure is not limited to these examples. Various screen layouts and various configurations of the electronic device may be configured according to a user configuration, a value configured when downloaded from an external server, and a value configured when shared from an external device.

Figure 8:
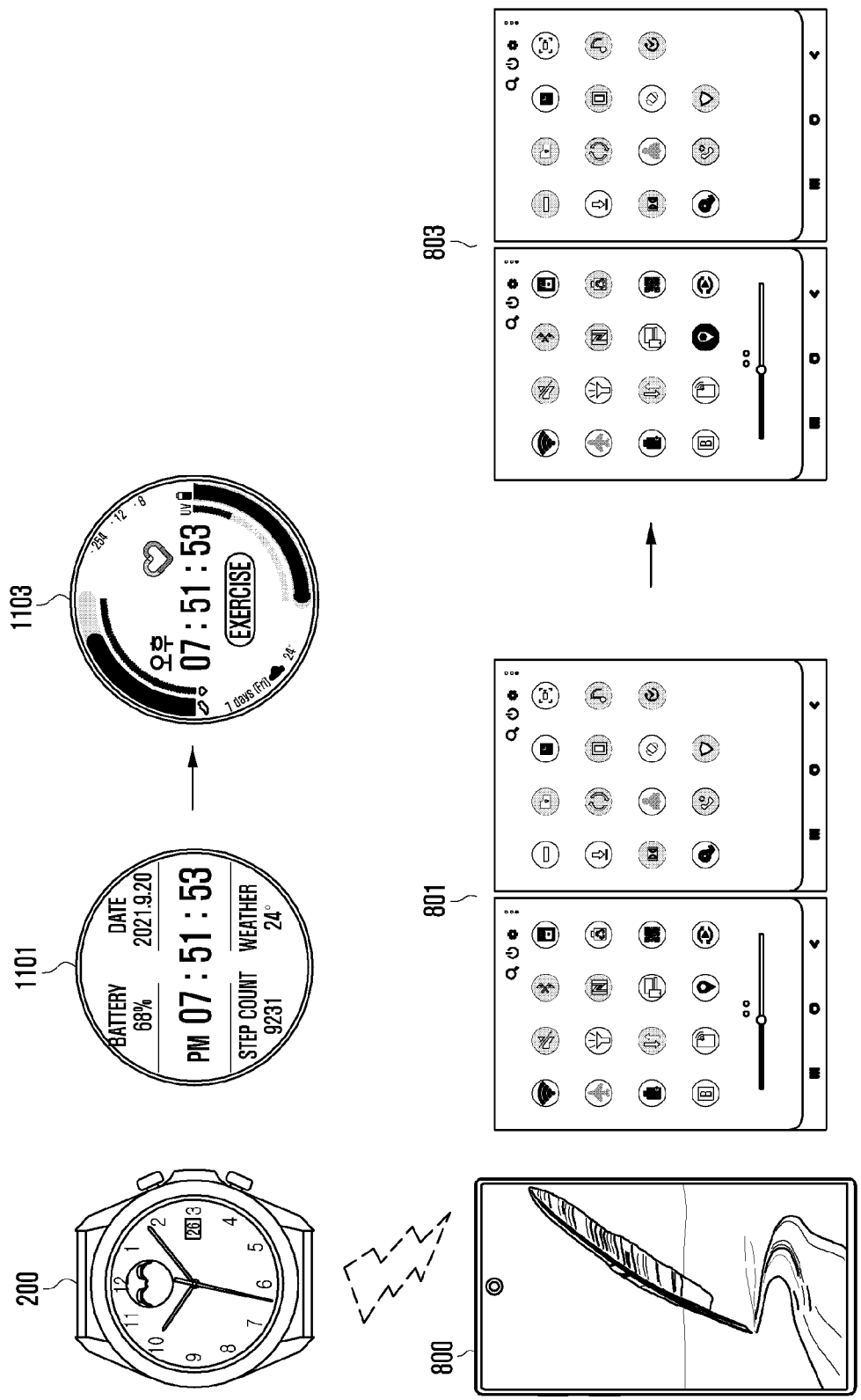
FIG. 8 illustrates an example in which a processor controls an external electronic device to change configuration information about the external electronic device corresponding to a screen according to various example embodiments.

FIG. 8 illustrates an example in which a processor (e.g., the processor 220 of FIG. 2) controls an external electronic device 800 to change configuration information about the external electronic device 800 corresponding to a screen according to various example embodiments.

According to an embodiment, the processor 220 may map configuration information about the external electronic device 800 to each corresponding standby screen in a third mapping table stored in a memory (e.g., the memory 230 of FIG. 2).

The memory 230 may temporarily or non-temporarily store mapping data obtained by mapping the standby screen and the configuration information about the external electronic device 800.

According to an embodiment, the processor 220 may store the mapping data including the third mapping table of the electronic device 200 in the memory 230. The third mapping table may include a standby screen field and/or an external device configuration field. The processor 220 may map an external device configuration corresponding to each standby screen in the mapping table. As illustrated in the disclosure, a first screen cell may correspond to a first external device configuration information cell, a second screen cell may correspond to a second external device configuration information cell, and a third screen cell may correspond to a third external device configuration information cell.

TABLE 6

| Standby screen | External device configuration |
|---|---|
| [First screen cell] | [First external device configuration information cell] |
| [Second screen cell] | [Second external device configuration information cell] |
| [Third screen cell] | [Third external device configuration information cell] |
| ... | ... |

Table 6 is an example of the third mapping table stored in the memory 230 according to various embodiments. A standby screen indicator indicating each standby screen may be stored in [first screen cell], [second screen cell], and [third screen cell] corresponding to the standby screen field. Configuration information about the external electronic device 800 corresponding to each standby screen may be stored in [first external device configuration information cell], [second external device configuration information cell], and [third external device configuration information cell] corresponding to the external device configuration field. For example, the configuration information about the external electronic device may include activation/deactivation of various modes, such as a dark mode, a Do Not Disturb mode, an always-on display (AOD) mode, a battery saving mode, a vibration mode, a Bluetooth mode, and a position tracking mode, and/or a screen brightness, and a volume, and/or may be a combination of values of configuration items.

According to various embodiments, the processor 220 may receive an instruction to change a first screen 1101 to a third screen 1103. According to an embodiment, the first screen 1101 and/or the third screen 1103 may be screen layouts displayed on a display (e.g., the display 260 of FIG. 2) when the electronic device 200 is in a standby state.

According to an embodiment, the processor 220 may receive a change instruction by a user input. For example, the change instruction may include various types of user inputs, such as a swipe touch input on the display 260, an input of clicking a button provided on the electronic device 200, selection of a setting of the third screen 1103 in a configuration application, and a motion input of shaking the electronic device 200.

According to an embodiment, the processor 220 may receive an instruction to change a screen to display a screen corresponding to a context. For example, in response to detecting a third context, the processor 220 may receive an instruction to change to the third screen to display the third screen 1103 corresponding to the third context.

According to various embodiments, the processor 220 may display the third screen 1103 on the display 260. According to an embodiment, the processor 220 may extract the third screen 1103 stored in the memory 230 to display the third screen.

According to various embodiments, the processor 220 may extract third external configuration information 803 about the external electronic device corresponding to the third screen 1103 from the third mapping data. According to an embodiment, the processor 220 may extract the third external configuration information 803 by retrieving a third external information cell from the third mapping table stored in the memory 230.

According to various embodiments, the processor 220 may transmit a signal for requesting a change of a configuration according to the extracted third external configuration information 803 to the external electronic device 800.

According to an embodiment, the processor 220 may transmit the signal for requesting the change of the configuration according to the third external configuration information 803 to the external electronic device 800 through a communication module (e.g., the communication module 190 of FIG. 1).

An electronic device according to various example embodiments may include a display, a memory configured to store a plurality of screens including a first screen and a second screen displayed on the display when the electronic device is in a standby state, configuration information about the electronic device including first configuration information related to a function of the electronic device when the first screen is displayed and second configuration information related to a function of the electronic device when the second screen is displayed, and first mapping data in which the plurality of screens is mapped to the configuration information, and a processor comprising processing circuitry, wherein the processor may be configured to receive an input to change the first screen to the second screen, switch a state of displaying the first screen to a state of displaying the second screen in response to the input, identify the second configuration information corresponding to the second screen, based on the first mapping data, and change a configuration of the electronic device, based on the second configuration information.

In the electronic device according to various example embodiments, the processor may be configured to store a third screen in the memory in response to obtaining the third screen displayed on the display when the electronic device is in the standby state, retrieve whether there is third configuration information related to a function of the electronic device corresponding to the third screen in the first mapping data, and change the configuration of the electronic device, based on a retrieval result.

In the electronic device according to various example embodiments, the processor may be configured to display a configuration screen for the third configuration information on the display in response to absence of the third configuration information according to the retrieval result, map the third configuration information corresponding to a user input to the third screen to store the third configuration information in the first mapping data in response to presence of the user input on the configuration screen, and map the third configuration information corresponding to a configuration value of the electronic device in a state before obtaining the third screen to the third screen to store the third configuration information in the first mapping data in response to absence of the user input on the configuration screen.

In the electronic device according to various example embodiments, the processor may be configured to map the first configuration information corresponding to a configuration value of the electronic device in a state before receiving an instruction to change the first screen to the second screen to the first screen to store the first configuration information in the first mapping data in response to receiving the instruction to change the first screen to the second screen.

In the electronic device according to various example embodiments, the processor may be configured to map the first configuration information corresponding to a user input to change the configuration of the electronic device to the first screen to store the first configuration information in the first mapping data in response to presence of the user input while displaying the first screen.

The electronic device according to various example embodiments may further include a sensor module and a communication module, wherein the memory may store second mapping data in which a plurality of contexts including a first context related to an environment of a user is mapped to the plurality of screens, and the processor may be configured to detect the first context, based on at least one of information collected by the sensor module, information collected by the communication module, information obtained from an external device, and information obtained from an external server, identify the first screen corresponding to the detected first context, based on the second mapping data, switch to the state of displaying the first screen, identify the first configuration information corresponding to the first screen, based on the first mapping data, and change the configuration of the electronic device, based on the first configuration information.

In the electronic device according to various example embodiments, the processor may be configured to display a screen for receiving an input on whether to permit a change of a standby screen of the electronic device in response to detecting the first context, switch to the state of displaying the first screen in response to obtaining the input to permit the change from a user, and change the configuration of the electronic device, based on the first configuration information.

The electronic device according to various example embodiments may further include a communication module configured to exchange data with an external electronic device, wherein the processor may be configured to control the communication module to transmit the second configuration information along with the second screen to the external electronic device, and control the communication module to transmit a signal for requesting the external electronic device to change a configuration of the external electronic device, based on the second configuration information, to the external electronic device.

The electronic device according to various example embodiments may further include a communication module configured to exchange data with an external server, wherein the processor may be configured to control the communication module to receive the third configuration information corresponding to the third screen along with the third screen from the external server, and change the configuration of the electronic device, based on the received third configuration information.

The electronic device according to various example embodiments may further include a communication module configured to exchange data with an external electronic device, wherein the memory may store external configuration information including first external configuration information and second external configuration information related to a configuration value of the external electronic device and third mapping data in which the plurality of screens is mapped to the external configuration information, and the processor may be configured to receive the input to change the first screen to the second screen, switch the state of displaying the first screen to the state of displaying the second screen in response to the input, identify the second external configuration information corresponding to the second screen, based on the third mapping data, and transmit a signal for requesting a change of a configuration of the external electronic device based on the second external configuration information to the external electronic device through the communication module.

An operation method of an electronic device according to various example embodiments may include storing, in a memory, a plurality of screens including a first screen and a second screen displayed on a display when the electronic device is in a standby state, storing, in the memory, configuration information about the electronic device including first configuration information related to a function of the electronic device when the first screen is displayed and second configuration information related to a function of the electronic device when the second screen is displayed, storing, in the memory, first mapping data in which the plurality of screens is mapped to the configuration information, receiving an input to change the first screen to the second screen, switching a state of displaying the first screen to a state of displaying the second screen in response to the input, identifying the second configuration information corresponding to the second screen, based on the first mapping data, and changing a configuration of the electronic device, based on the second configuration information.

The operation method of the electronic device according to various example embodiments may include storing a third screen in the memory in response to obtaining the third screen displayed on the display when the electronic device is in the standby state, retrieving whether there is third configuration information related to a function of the electronic device corresponding to the third screen in the first mapping data, and changing the configuration of the electronic device, based on a retrieval result.

The operation method of the electronic device according to various example embodiments may include displaying a configuration screen for the third configuration information on the display in response to absence of the third configuration information according to the retrieval result, mapping the third configuration information corresponding to a user input to the third screen to store the third configuration information in the first mapping data in response to presence of the user input on the configuration screen, and mapping the third configuration information corresponding to a configuration value of the electronic device in a state before obtaining the third screen to the third screen to store the third configuration information in the first mapping data in response to absence of the user input on the configuration screen.

The operation method of the electronic device according to various example embodiments may include mapping the first configuration information corresponding to a configuration value of the electronic device in a state before receiving an instruction to change the first screen to the second screen to the first screen to store the first configuration information in the first mapping data in response to receiving the instruction to change the first screen to the second screen.

The operation method of the electronic device according to various example embodiments may include mapping the first configuration information corresponding to a user input to change the configuration of the electronic device to the first screen to store the first configuration information in the first mapping data in response to presence of the user input while displaying the first screen.

The operation method of the electronic device according to various example embodiments may include storing, in the memory, second mapping data in which a plurality of contexts including a first context corresponding to an environment of a user is mapped to the plurality of screens, detecting the first context, based on at least one of information collected by a sensor module, information collected by a communication module, information obtained from an external device, and information obtained from an external server, identifying the first screen corresponding to the detected first context, based on the second mapping data, switching to the state of displaying the first screen, identifying the first configuration information corresponding to the first screen, based on the first mapping data, and changing the configuration of the electronic device, based on the first configuration information.

The operation method of the electronic device according to various example embodiments may include displaying a screen for receiving an input on whether to permit a change of a screen of the electronic device in response to detecting the first context, switching to the state of displaying the first screen in response to obtaining the input to permit the change from a user, and changing the configuration of the electronic device, based on the first configuration information.

The operation method of the electronic device according to various example embodiments may include controlling a communication module to transmit the second configuration information along with the second screen to an external electronic device, and controlling the communication module to transmit a signal for requesting the external electronic device to change a configuration of the external electronic device, based on the second configuration information, to the external electronic device.

The operation method of the electronic device according to various example embodiments may include controlling a communication module to receive the third configuration information corresponding to the third screen along with the third screen from an external server, and changing the configuration of the electronic device, based on the received third configuration information.

The operation method of the electronic device according to various example embodiments may include storing, in the memory, external configuration information including first external configuration information and second external configuration information related to a configuration value of an external electronic device, storing, in the memory, third mapping data in which the plurality of screens is mapped to the external configuration information, receiving the input to change the first screen to the second screen, switching the state of displaying the first screen to the state of displaying the second screen in response to the input, identifying the second external configuration information corresponding to the second screen, based on the third mapping data; and controlling a communication module to transmit a signal for requesting a change of a configuration of the external electronic device based on the second external configuration information to the external electronic device. "Based on" as used herein covers based at least on.

It should be appreciated that various example embodiments and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via at least a third element(s).

In addition, the embodiments disclosed in the specification and drawings are only presented as specific examples to easily explain the technical contents according to the embodiments disclosed in this document and help understanding of the embodiments disclosed in this document. It is not intended to limit the scope. Therefore, the scope of various embodiments disclosed in this document is that all changes or modified forms derived based on the technical ideas of various embodiments disclosed in this document, in addition to the example embodiments, are included in the scope of various embodiments disclosed in this document. should be interpreted.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:
1. An electronic device comprising:
 a display;
 a memory configured to store at least:
  information regarding a plurality of screens comprising a first screen and a second screen to be displayed on the display in a case that the electronic device is in a standby state,
  configuration information about the electronic device, the configuration information comprising first configuration information related to a function of the electronic device in a case that the first screen is displayed and second configuration information related to a function of the electronic device in a case that the second screen is displayed, and first mapping data in which the plurality of screens is mapped to the configuration information; and at least one processor comprising processing circuitry and operatively associated with the memory, wherein the at least one processor, individually or collectively, is configured to:

receive an input to change the first screen to the second screen;

switch a state of displaying the first screen to a state of displaying the second screen based on the input;

identify the second configuration information corresponding to the second screen, based on the first mapping data;

change a configuration of the electronic device, based on the second configuration information;

control to store a third screen in the memory in response to obtaining the third screen displayed on the display in a case that the electronic device is in the standby state;

retrieve whether there is third configuration information related to a function of the electronic device corresponding to the third screen in the first mapping data;

change the configuration of the electronic device, based on a retrieval result;

control to display a configuration screen for the third configuration information on the display in response to absence of the third configuration information based on the retrieval result;

map the third configuration information corresponding to a user input to the third screen to store the third configuration information in the first mapping data in response to presence of the user input on the configuration screen; and map the third configuration information corresponding to a configuration value of the electronic device in a state before obtaining the third screen to the third screen to store the third configuration information in the first mapping data in response to absence of the user input on the configuration screen.

2. The electronic device of claim 1, wherein the at least one processor, individually or collectively, is configured to map the first configuration information corresponding to a configuration value of the electronic device in a state before receiving an instruction to change the first screen to the second screen to the first screen to store the first configuration information in the first mapping data in response to receiving the instruction to change the first screen to the second screen.

3. The electronic device of claim 1, wherein the at least one processor, individually or collectively, is configured to map the first configuration information corresponding to a user input to change the configuration of the electronic device to the first screen to store the first configuration information in the first mapping data in response to presence of the user input while displaying the first screen.

4. The electronic device of claim 1, further comprising:
a sensor module comprising at least one sensor; and
a communication module comprising communication circuitry,
wherein the memory is configured to store second mapping data in which a plurality of contexts comprising a first context related to an environment of a user is mapped to the plurality of screens, and
wherein the at least one processor, individually or collectively, is configured to:

detect the first context, based on at least one of information collected by the sensor module, information collected by the communication module, information obtained from an external device, and information obtained from an external server;

identify the first screen corresponding to the detected first context, based on the second mapping data;

control to switch to the state of displaying the first screen;

identify the first configuration information corresponding to the first screen, based on the first mapping data; and change the configuration of the electronic device, based on the first configuration information.

5. The electronic device of claim 4, wherein the at least one processor, individually or collectively, is configured to:

control to display a screen for receiving an input on whether to permit a change of a standby screen of the electronic device in response to detecting the first context;

control to switch to the state of displaying the first screen in response to obtaining the input to permit the change from a user; and change the configuration of the electronic device, based on the first configuration information.

6. The electronic device of claim 1, further comprising a communication module, comprising communication circuitry, configured to exchange data with an external electronic device, wherein the at least one processor, individually or collectively, is configured to:

control the communication module to transmit the second configuration information along with the second screen to the external electronic device; and control the communication module to transmit a signal for requesting the external electronic device to change a configuration of the external electronic device, based on the second configuration information, to the external electronic device.

7. The electronic device of claim 1, further comprising a communication module, comprising communication circuitry, configured to exchange data with an external server, wherein the at least one processor, individually or collectively, is configured to:

control the communication module to receive the third configuration information corresponding to the third screen along with the third screen from the external server; and change the configuration of the electronic device, based on the received third configuration information.

8. The electronic device of claim 1, further comprising a communication module, comprising communication circuitry, configured to exchange data with an external electronic device, wherein the memory is configured to store:

external configuration information comprising first external configuration information and second external configuration information related to a configuration value of the external electronic device; and third mapping data in which the plurality of screens is mapped to the external configuration information, and wherein the at least one processor, individually or collectively, is configured to:

receive the input to change the first screen to the second screen;

control to switch the state of displaying the first screen to the state of displaying the second screen in response to the input;

identify the second external configuration information corresponding to the second screen, based on the third mapping data; and control to transmit a signal for requesting a change of a configuration of the external electronic device based on the second external configuration information to the external electronic device via the communication module.

9. An operation method of an electronic device, the operation method comprising:

storing, in a memory, a plurality of screens comprising a first screen and a second screen displayed on a display in a case that the electronic device is in a standby state, storing, in the memory, configuration information about the electronic device, the configuration information comprising first configuration information related to a function of the electronic device in a case that the first screen is displayed and second configuration information related to a function of the electronic device in a case that the second screen is displayed;

storing, in the memory, first mapping data in which the plurality of screens is mapped to the configuration information;

receiving an input to change the first screen to the second screen;

switching a state of displaying the first screen to a state of displaying the second screen based on the input;

identifying the second configuration information corresponding to the second screen, based on the first mapping data; and changing a configuration of the electronic device, based on the second configuration information;

storing a third screen in the memory in response to obtaining the third screen displayed on the display in a case that the electronic device is in the standby state;

retrieving whether there is third configuration information related to a function of the electronic device corresponding to the third screen in the first mapping data;

changing the configuration of the electronic device, based on a retrieval result;

displaying a configuration screen for the third configuration information on the display in response to absence of the third configuration information according to the retrieval result;

mapping the third configuration information corresponding to a user input to the third screen to store the third configuration information in the first mapping data in response to presence of the user input on the configuration screen; and mapping the third configuration information corresponding to a configuration value of the electronic device in a state before obtaining the third screen to the third screen to store the third configuration information in the first mapping data in response to absence of the user input on the configuration screen.

10. The operation method of claim 9, comprising mapping the first configuration information corresponding to a configuration value of the electronic device in a state before receiving an instruction to change the first screen to the second screen to the first screen to store the first configuration information in the first mapping data in response to receiving the instruction to change the first screen to the second screen.

11. The operation method of claim 9, comprising mapping the first configuration information corresponding to a user input to change the configuration of the electronic device to the first screen to store the first configuration information in the first mapping data in response to presence of the user input while displaying the first screen.

* * * * *